DISTORTION CORRECTION IN CATHODE-RAY TUBES

Filed Sept. 18, 1956 3 Sheets-Sheet 1

INVENTOR.
RAY H. LEE
BY
Lippincott & Smith
ATTORNEYS

DISTORTION CORRECTION IN CATHODE-RAY TUBES

Filed Sept. 18, 1956 3 Sheets-Sheet 2

INVENTOR.
RAY H. LEE
BY Lippincott & Smith
ATTORNEYS

DISTORTION CORRECTION IN CATHODE-RAY TUBES

Filed Sept. 18, 1956 3 Sheets-Sheet 3

INVENTOR.
RAY H. LEE
BY
Lippincott & Smith
ATTORNEYS

United States Patent Office 2,890,379

Patented June 9, 1959

2,890,379

DISTORTION CORRECTION IN CATHODE-RAY TUBES

Ray H. Lee, Emeryville, Calif., assignor to Chromatic Television Laboratories, Inc., New York, N.Y., a corporation of California Application September 18, 1956, Serial No. 610,569

11 Claims. (Cl. 315—14)

This invention relates to means for correcting aberrations and distortions that occur in cathode-ray tubes for the display of television images, resulting, primarily, from differences in the length of path traversed by the electron beam in scanning the nominally rectangular raster that defines the picture field, and from the variations in the angle of incidence of the scanning beam at the target area.

There are several causes of the distortions and aberrations which the invention is designed to correct. In display tubes wherein the angle through which the beam is deflected is relatively small the imperfections in the produced image may be negligible. With the increasing demand for larger pictures and shorter tubes, using wide angles of beam deflection, the aberrations become more important and may interfere seriously with the quality of the pictures produced. The effects to be discussed occur in the reproduction of both monochrome and color television images and the present invention is applicable to cathode-ray tubes for the production of images of either type, but because the effects are likely to be more disconcerting in the reproduction of color the invention is particularly applicable to the latter.

The types of aberration that occur in the scanning of a television image can be most readily understood by considering, first, the scanning of a rectangular raster in a conventional monochrome or black-and-white picture tube. In such a tube a narrow beam of electrons, of circular cross-section, is developed in an electron gun directed at the center of the raster. In the gun the beam is accelerated to the ultimate velocity at which it travels to the screen. In leaving the gun is diverges slightly but is refocused by either a magnetic or static electron lens and is substantially at its minimum diameter at its point of impact of the screen.

For the purpose of the present discussion no material error is introduced by considering the paths of the electrons reaching the screen as parallel. In the process of scanning the screen, a transverse velocity is imparted to the beam, usually by a magnetic deflecting yoke located at the neck of the funnel-shaped envelope of the tube, and as a result of the transverse velocities applied at this point the beam travels in a nearly rectilinear path from a center of deflection in the tube neck to its instantaneous point of impact. The display screen, positioned in the viewing window that closes the mouth of the funnel-shaped envelope, is very nearly planar. To produce the deflecting fields sawtooth waveforms are produced that are as nearly linear as possible. The deflecting fields therefore also vary linearly.

In passing through a deflecting field the beam is bent through an angle whose sine is proportional to the field intensity. The displacement from the center of the raster, of the spot produced by the impact of the beam upon the screen is, however, proportional to the tangent of the angle of deflection. For small angles of deflection the sine and tangent of the angle may be considered as varying in direct proportion but where the beam is deflected through wide angles the tangent varies much more rapidly than does the sine. As a result, in scanning the corners of the field the beam is displaced more widely than it is at the centers of the sides of the raster, resulting in a pin-cushion distortion of the field being scanned and the wider the angle of deflection the greater and more apparent this pin-cushion distortion becomes.

Another effect that results from the variation in the angle of the beam is a change in size and shape of the focal spot. Considering the beam as circular when undeflected, at the corners of the field the spot produced is the intersection of a cylinder with an oblique plane and is therefore eliptical. The resolution of the image is a function of the diameter of the spot and therefore the picture loses sharpness with increasing deflection.

In the production of color images additional aberrations are introduced due to the variation in angle of incidence. In tubes of the PDF (post-deflection-focusing) type, wherein a color grid or focusing grid, mounted fairly close to the screen, is used to refocus the beam to a dimension small enough to impact a phosphor area emissive of a single primary color, the effective focal length of the elementary lenses used to accomplish the post-deflection focusing varies with the angle of impact, so that with focusing fields of a given strength the beam tends to be overfocused at the corners of the screen and underfocused at the center, the amount of post-deflection focusing usually being so chosen that the minimum size of the focal spot is in some intermediate zone between the center and the edges of the screen. A further aberration, indirectly due to the variation in angle of incidence, is due to the coulomb effect, i.e., the mutual repulsion of the electrons constituting the beam. This latter effect is in proportion to the intensity of the beam. As a result of the coulomb forces the outer electrons of the beam are subjected to an outward accelerating force tending to cause them to diverge instead of converging. In scanning the corners of the screen the electron paths are longer. The defocusing forces therefore have a longer time to act and impart greater divergent velocities which are effective over a longer time. As a result beams carrying heavier currents tend to "blow up," resulting in larger focal spots than beams carrying low current values. The diverging forces can be compensated by the initial focusing lens at the neck of the tube for an average beam density in some particular zone of the screen. For other beam densities this may result in compensation in other zones, but the greater the variation in path length or, more properly, in the transit time of the electrons between the electron gun and the screen, the greater the disparity between spot size at maximum and minimum beam density and hence the greater the disparity in spot size due to this cause alone.

The broad object of the present invention is to provide a means for minimizing the various aberrations and distortions here discussed. More specifically, one of the objects of the invention is to provide means for completely eliminating pin-cushion distortion of the television raster. Another object is to decrease the variation in spot size and consequent variation in resolution due to variation in the angle of incidence, and still another object, applicable in certain types of equipment, is to decrease the similar variations traceable to the coulomb effect by decreasing the transit time during which this effect is operative and equalizing the transit times for varying angles of deflection.

As was mentioned above, in the conventional cathode-ray display of picture tube the beam, after leaving the center of deflection at the neck of the tube, travels in an almost perfect rectilinear path to the target or screen area. Because the screen and the walls of the tube are normally operative at the same potential, the electrons travel in a substantially field-free space and therefore at constant velocity. The field from the deflection yoke gives the electrons a certain transverse velocity and since their total velocity is constant their paths are straight until they reach either the screen itself or, in color tubes, the mask or lens grid through which color-selection is accomplished. In accordance with the present invention the space through which the electrons travel is no longer field-free. In conventional practice the final electrode of the electron gun proper, located in the neck of the tube, is connected to the envelope of the tube, if the latter is of metal, or, in the case of a glass tube, to a conductive coating deposited on its inner surface so that the target area is operated at substantially this potential. In accordance with the present invention instead of the entire interior of the tube forming, in effect, a continuation of the final anode of the gun itself, only a portion of the tube wall is so connected, the resulting electrode configuration within the flaring portion of the tube being a lobed structure arranged symmetrically with respect with the raster area. The target, as viewed from the gun, is operated at a potential differing from that of the lobed electrode structure. The result is that instead of the space traversed by the beam being field-free there is a spatially-varying field having its major components longitudinally to the tube that tends to accelerate the beam electrons, either positively or negatively, depending upon the relative potentials of the lobed structure and the screen. Dut to the difference of potential between the screen and the lobed electrode an electric field exists between the two, the lines of force of this field terminating, as is well known, normal to the surfaces of the structures between which it exists. The field is most concentrated in the region where the electrodes approach each other most closely and the transverse component of the field increases as the distance from the tube wall decreases. The electrons passing through the field are accelerated in the direction of the lines of force. If the lobed electrode is operated at a more positive potential than the target the transverse component of the field will be directed outwardly from the axis of the tube while the longitudinal component will impart a negative acceleration (or deceleration) to the electrons, and the arrangement can be considered as forming an aspherical diverging lens; if the reverse is the case the aspherical lens is diverging. Either arrangement may be used to correct pin-cushion distortion of the field and the other aberrations that have been referred to; if a diverging type of lens is used the lobes extend toward the center of the sides of the rectangular target area whereas with a converging lens the lobes project toward the corners of the field of view. This arrangement produces precisely the opposite effect to that which might normally be expected. Considering, for example, an electron lens of the diverging type, for a given strength of a horizontal deflecting field applied by the yoke a certain horizontal component of velocity is imparted to the beam. As they enter the non-uniform field they are accelerated negatively by the longitudinal component of the field and therefore require a longer time to traverse the distance between the gun and screen but they still retain the transverse velocity imparted to them by the yoke. It might therefore appear that as a result of this effect they would diverge most strongly where the lobed electrode is most distant from the screen. Experiment has proved, however, that while this effect does exist, particularly near the axis of the tube, it is outweighed near the edges by the transverse acceleration due to the field and the net effect of the arrangement is that the longer the lobe the greater the differential deflection produced by it.

The simple diverging lens described, used alone, corrects the pin-cushion distortion of the field but not the other aberrations that have been referred to. The lobed electrode flaring outwardly from the neck of the tube is a primary component of all modifications of the invention. With the diverging type of lens, however, it actually increases the angle of incidence of the beam in some portions of the raster. It partially corrects for blow-up in the size of the spot due to coulomb effect (for example, in constructions where the electrons must impinge on a color grid at a definite velocity) by permitting the electrons to travel through a portion of their path at a higher velocity than that required by the electron lens system at the grid. Where a converging type of lens is used, however, the beam is bent inwardly as it approaches the target and it therefore approaches more nearly a normal angle of incidence at the periphery of the raster. By adding a second electrode formed, preferably, by a coating on the tube surface and comprising a band of substantially uniform width surrounding the tube, closely adjacent to the plane of the target, a converging system can be produced that still permits the use of relatively low target potentials while retaining the advantages of a converging system. As will be shown hereinafter, by properly choosing the relative potentials of the lobed electrode, band and screen, the pin-cushion distortion can be substantially completely corrected and the other aberrations discussed above can be greatly reduced.

How this is accomplished will be better understood from the description of the two major modifications of the invention which follow. This description is illustrated in the accompanying drawings, wherein.

Figure 1:
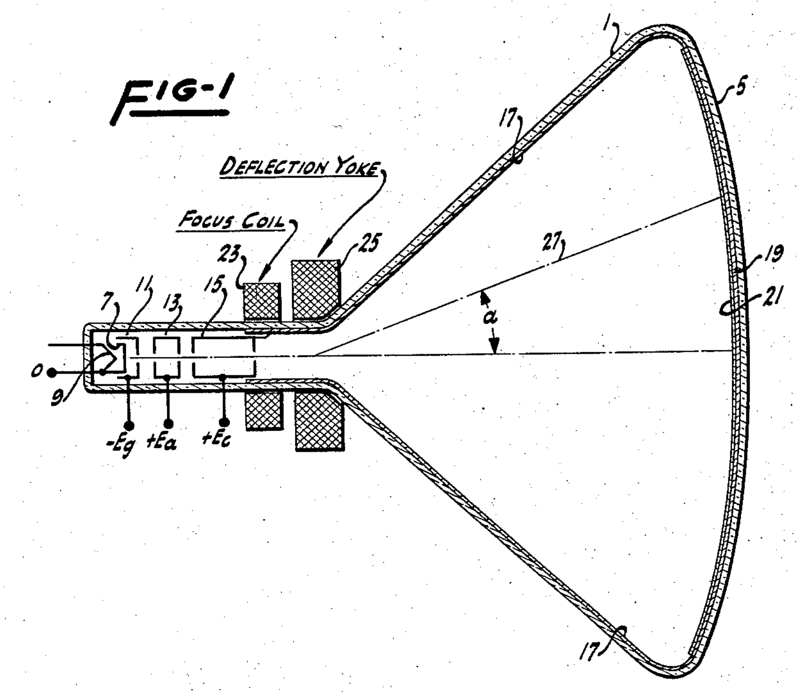
Fig. 1 is a schematic cross-sectional view of a conventional television display tube.

In order to illustrate more clearly the differences in structure and operation between a tube embodying the present invention and a conventional tube, one of the latter type is illustrated in Fig. 1. This tube comprises a funnel-shaped envelope 1, terminating at one end in a neck 3 and with the other end or mouth of the funnel closed by a transparent window 5. An electron gun is positioned in the tube neck. Various types of gun are well known but the one chosen for illustration comprises an electron-emitting cathode 7, which in operation is raised to emitting temperature by a heater 9. A control electrode or grid 11, in the form of a cup having a perforation in the bottom thereof, surrounds the cathode. In practice it is operated at a potential negative to the cathode and the resultant fields form a primary lens tending to focus the emitted electron into a beam. Immediately beyond the grid 11 is a first anode 13, provided at each end with collimating apertures alined with the opening in the bottom of the cup 11. First anode 13 might, in practice, be excited to a potential somewhere in the neighborhood of 300 volts positive to the cathode, the fields between the grid and the first anode forming a second converging electron lens. Beyond the first anode, again, is a second anode 15, also provided with apertures alined with those in the first anode and grid for the passage of the electron beam. The second anode may be operated at somewhere in the neighborhood of 18 kv positive to the cathode datum potential, and a second electron lens is formed between the first and second anodes.

Additional electrodes may be included in the gun, forming one or more electron images of one of the apertures which defines the initial diameter of the electron beam. Since the structure shown is one that has been used and the nature of the gun itself is unimportant to the operation of the invention under consideration, it appears unnecessary to discuss such alternative forms except to point out that where a "second anode" is referred to in this specification it means the final gun electrode within the neck of the tube, even though it might in some constructions, be a fifth or sixth electrode in a succession.

The second anode contacts a conductive coating that covers the internal wall of the envelope (herein assumed to be of glass) extending from within the neck of the tube to cover the entire flaring portion up to the window 5. A phosphor coating 19, which luminesces upon electron impact, is deposited upon the window 5 and preferably a layer of aluminum 21 overlies the phosphor coating and is connected to the conductive coating 17 on the tube wall, to convert the interior of the body of the envelope to an equipotential space. The conductive layer over the screen is omitted in some tubes; when this is the case electrons reaching the screen excite emission of secondary electrons which escape into the body of the tube. The number of secondary electrons emitted for each incoming primary of electron will vary with the electron velocity and the materials of the screen. In this case, when the operation of the tube starts the bombarded screen will charge, positively or negatively, depending upon whether the number of secondary electrons emitted is less or greater than the number of inflowing electrons, until the screen reaches an equilibrium potential. This potential will normally be within a few volts of the potential of the conductive coating 17. The differential potential is so small, in comparison with the accelerating voltage that has been applied by the second anode of the gun, that no material error is involved in still considering the interior of the tube as an equipotential space.

The beam is so focused, either by the construction of the gun itself or by a focusing coil 23 surrounding the neck of the tube, as to form an image of the collimating aperture substantially at the surface of the screen. A deflection yoke 25 is mounted at the junction of the neck and the funnel of the tube. The yoke comprises two sets of coils, one oriented so as to deflect the beam horizontally, the other to deflect it vertically, the coils of the yoke being mounted so as to produce crossed magnetic fields through the yoke at the location of the coils.

The acceleration imparted to an electron in traveling through a magnetic field is always normal to the electron path and to the field itself. This acceleration can neither increase or decrease the speed of the electron; it can merely change its direction. The path of the electron within the field is curved but after leaving the field and while traversing the field free-space and the screen it is rectilinear. Because the field of the yoke falls off very rapidly beyond the edges of the deflecting coil no appreciable error is introduced by considering that the beam is bent sharply through an angle $a$ at the center of the yoke. The line 27 indicates an electron path between the center of deflection and the screen.

The electrons of the beam as they pass through the deflecting field are traveling at uniform velocity. As they travel through the deflecting field in substantially equal times the accelerations normal to their paths imparted to them by the deflecting field therefore act for substantially equal times. The accelerating forces are directed proportional to the strength of the deflecting field. The resultant transverse velocities imparted to the beam are therefore also proportional to the deflecting field intensity, and hence it comes out that the sine of the angle $a$ is, to a close approximation, proportional to the field intensity, which is the vector sum of the intensities of the horizontal and vertical deflecting fields.

The display screen, if not actually planar, is very nearly so. Because the speed of the beam electrons is not affected by the deflection the transit time, in traversing the distance between the deflecting coils and the screen, is directly proportional to the distance from the center of deflection to the point of impact and, assuming the screen is planar, this is inversely proportional to the cosine of the angle of deflection, i. e., directly proportional to its secant. For small angles of deflection the secant varies very slowly, but with modern tubes, wherein the angle of deflection to reach the corner of a rectangular screen may be as much as 45 degrees, the transit time to the edge of the screen may be as much as 40 percent greater than that to the screen center.

Since the acceleration due to the coulomb forces in the beam have a longer time to operate and produce constantly increasing divergent velocities, the blow-up in spot size in the corners of the screen for high densitiy beams can be several times greater than at the screen center.

Figure 2:
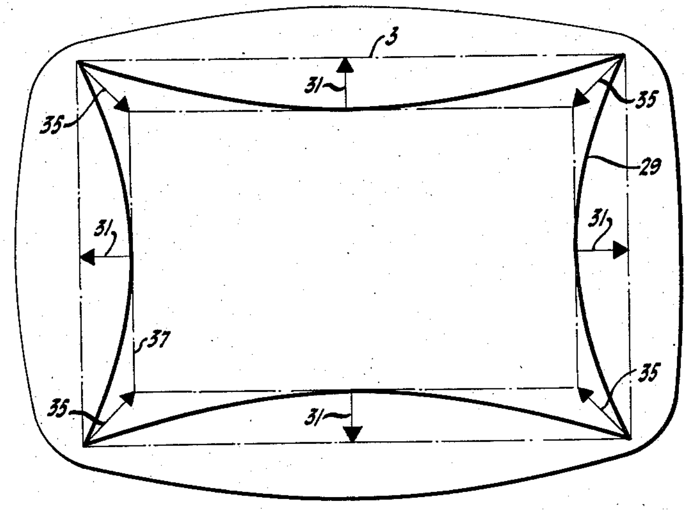
Fig. 2 is a diagram of the face of such a tube, illustrating the shape of a raster produced thereon and showing the pin-cushion distortion of such a raster and the corrections necessary to compensate for it.

The effect on the shape of the raster so traced by the deflection is illustrated in Fig. 2. Still assuming that the screen is actually planar, the displacement of the point of impact of the beam when deflected through an angle $a$ is proportional to tan $a$. It has already been shown that the deflecting force is proportional to sine $a$. The ratio of displacement to deflecting force is therefore equal to $$\frac{\tan a}{\text{sine } a} = \sec a$$

The result when the deflection is accomplished by linear sawtooth waves is approximately as illustrated in Fig. 2 wherein the solid line 29 is the outline of the raster produced by vertical and horizontal deflections through relatively large angles.

In order to produce a satisfactory correction of this distortion it is necessary either to increase the deflection of the beam at the center of each side of the rectangle, displacing the sides of the raster outwardly as is indicated by the arrows 31, to the position indicated by the dashed rectangle 33, or to decrease the deflections at the corners of the raster in the direction shown by the arrows 35 to make the raster coincide with the rectangle 37. To accomplish the first of these effects requires that diverging forces be applied which reach their maxima at the centers of the rectangle sides; to produce the other demands that converging forces be applied at each corner. In either case the forces applied should fall off rapidly as the angle of deflection decreases.

Figure 3:
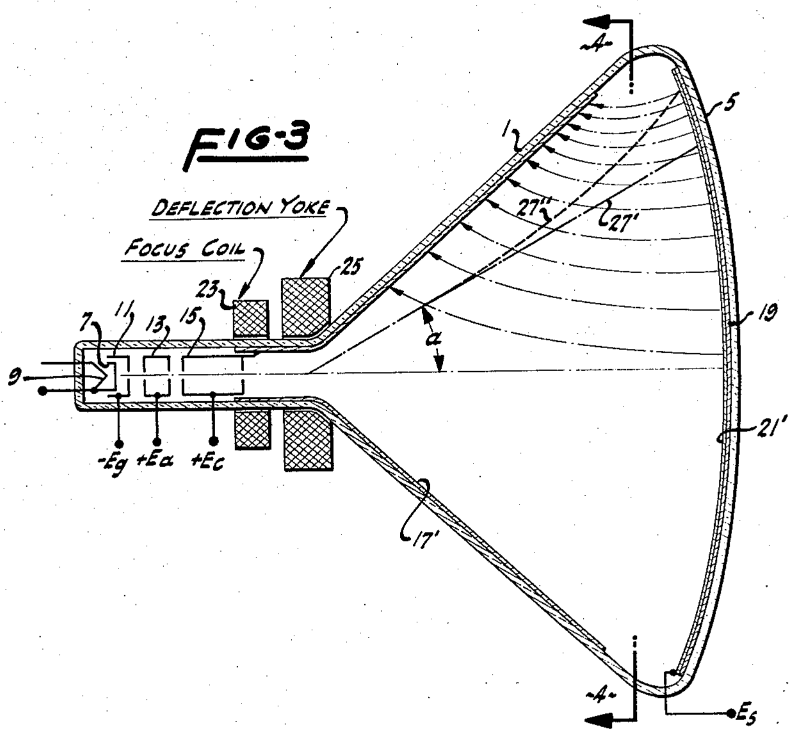
Fig. 3 is a diagrammatic cross-section of a tube in accordance with one form of the present invention, illustrating the lines of the force of a negatively-accelerating field and the resultant divergence of the electron paths.
Figure 4:
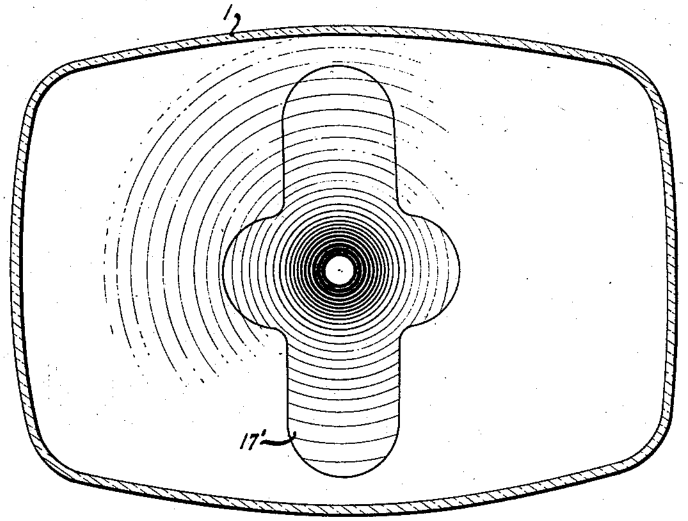
Fig. 4 is a diagrammatic cross-section, parallel to the screen, of the tube of Fig. 3, illustrating the shape of the lobed electrode.
Figures 5, 6:
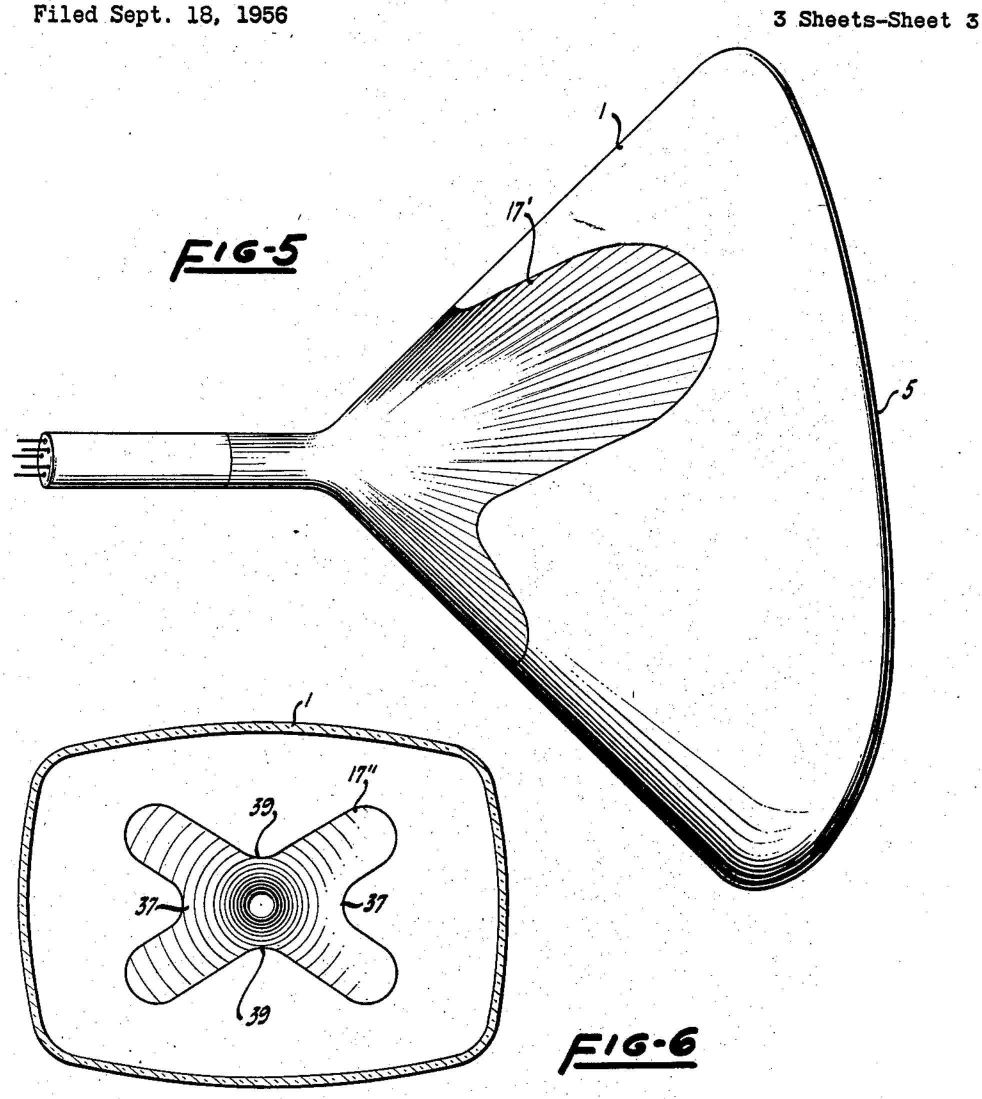
Fig. 5 is an oblique isometric view of the tube of Fig. 3 illustrating the appearance of the lobed electrode as viewed from this aspect.
Fig. 6 is a view similar to Fig. 4 which illustrates the form of a lobed electrode employed to form a lens of the converging type for correction of pin-cushion distortion.

In order to correct the pin-cushion distortion by applying diverging forces, the construction illustrated schematically in Fig. 3 is employed. Since the construction of the electron gun is the same as in Fig. 1 the same reference characters are applied to the various elements. The second anode of the gun is electrically connected to a conducting coating 17′, as in the case of the coating 17 of Fig. 1, but instead of this coating covering the entire internal surface of the tube and connecting with and operating at the same potential as the conductive layer 21 on the screen it is shaped substatnially as illustrated in Figs. 4 and 5. The conductive layer 21′ is operated at a materially lower voltage than the coating 17′. The layer 17′ is lobed, the lobes being symmetrical with respect to the raster to be traced. The longer lobes extend toward the longer sides of the raster, the shorter lobes toward the shorter side and the maximum degree of indentation between the lobes is located on lines extending from the center of deflection of the beam toward the corners of the raster.

The dot-dash arrows in Fig. 3 indicate the direction of the lines of force of the electric field thus produced. The field intensity is an inverse function of the distance between the coating 17' and the layer 21', measured along the lines of force. The diagram of Fig. 3 is taken along a vertical section of the tube, where the lobe has its maximum length. If we assume the beam to be deflected in the plane of section so that the direct path from the center of deflection to the screen would be along the broken line 27' it will be seen that it crosses the lines of force of the field in a direction that tends to deflect its path outward generally along the dash line 27''. Near the electron gun, where the field is weak, this deflection is relatively small. As it approaches the end of the lobe the field becomes progressively stronger and the outward curvature of the path progressively greater.

All the lines of force from the layer 21 must terminate on the conductor 17'. The same sort of action as has been described along the larger lobes is also effective, but to a lesser degree, along the shorter lobes. The indentations between the two lobes are very largely shielded and the deflection of the beam when it is directed toward the corner of the raster is very small, the beam traveling in nearly a straight line. The beam is, however, decelerated by the longitudinal component of the field and its velocity is decreased. Even so, however, if it is assumed that the screen is at the same potential in both the constructions of Figs. 1 and 3, the average velocity of the beam will be greater in the Fig. 3 construction. The transit time of the beam wil be decreased and the blow-up in spot size due to coulomb effect will be correspondingly decreased.

As was shown in connection with Fig. 2, the correction for pin-cushion distortion can be achieved either by bringing the centers of the sides of the raster out or the corners of the raster in. This latter effect can be achieved by locating the lobes at the corners of the funnel instead of the middle of the sides, as illustrated in Fig. 4, and operating the screen at a higher potential than the lobed electrode. In this case the curvature of the lines of force at the corners would be very similar to that depicted in Fig. 3, but the direction of the field would be reversed so that it would tend to converge the electrons toward the axis of the tube and to accelerate them instead of slowing them down. To effect the proper correction the indentations 37 between the lobes 17'', facing the longer dimension of the raster, should be shallower than the indentations 39 facing the longer side, since the minimum converging effect is required vertically of the raster.

This last described construction is preferable because the deflection is inward and takes effect to a maximum degree adjacent to the ends of the lobes; the result is to make the angle of incidence of the electrons at the screen more nearly perpendicular, therefore decreasing the over-all spot size by making it more nearly round. For a low value of target voltage, however, the effect of this construction is unfavorable as far as the coulomb effect is concerned.

Figure 7:
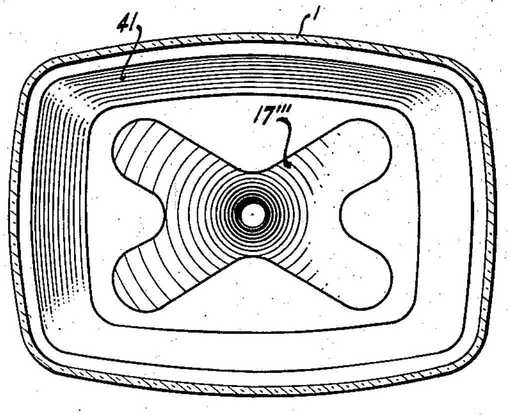
Fig. 7 is a view similar to Figs. 4 and 6 illustrating the electrode conformations used to retain uniform spot shape by controlling the beam impact angle to bring it substantially normal to the impacted target surface.

Either the modification using the electrode conformation of Fig. 4 or that using the Fig. 6 conformation may be employed in monochrome tubes. In color tubes, using a focusing or color-control grid in addition to the conductive film 21 which covers the screen, the best focusing effect is obtained with a grid potential with reference to the cathode, between one-third and one-fourth that of the screen. The grid, in this case, takes the place of the film 21' in establishing the shape of the electric field that does the correcting. As it is desirable that the average velocity of the electrons be as high as possible this practically dictates that the diverging form of the device, using the lobed electrode illustrated in Fig. 4, be employed in order to minimize the coulomb effect on the spot size. This disadvantage can be overcome, however, by employing an additional electrode in the system comprising a conductive band of substantially uniform width encircling the tube and terminating at or very near the plane of the lens-grid, as illustrated in Fig. 7. The lobed electrode 17''' is substantially the same as that illustrated in Fig. 6. It is operated at a fairly low potential, perhaps 6 kv. The conductive band 41 is raised to a much higher positive potential, perhaps 18 kv. The color-grid, mounted directly beyond the band is again under low potential, 4½ to 6 kv., and the final film on the screen will again be at high potential.

The primary effect of this arrangement is a converging lens, formed between electrode 17''' and 41. The beam is accelerated and travels at a higher velocity than it would in a conventional tube with a coating operating at the same potential as the grid, with an over-all decrease in spot size. The converging lens tends to straighten the paths of the electrons so that their angles of incidence are substantially normal to the screen. This is true despite the fact that a uniform diverging lens is formed between the grid and the band electrode 41; the latter lens is thin and is located so close to the screen that the diverging accelerations imparted by it have little time to act and the resulting divergence is small.

If the envelopes used for television tubes were true rectangles, with sharply defined corners and truly frusto-pyramidal funnels it might be possible to define accurately the shape of the lobes to be used to give a desired correction. As of the present date nearly all of the tubes manufactured, particularly for color, are of the so-called "rectangular" type, but their actual forms are practically impossible to define analytically. Furthermore, the flare of the funnel-shaped portion is not uniform and the tube blanks supplied to different manufacturers using different structures vary to a considerable degree. The shape of the lobes to effect a desired correction will vary with the shape of the funnel walls; therefore, for a particular shape of envelope, the shape of the lobes must eventually be determined empirically. The shapes shown in the drawing are those that have proved satisfactory in practice to obtain the type of correction that has been attributed to them in tubes of the form shown, but other envelope shapes would require some modification in shape and size of the lobes. In an over-all electrode structure of approximately the proper conformation, however, there is a considerable degree of adjustment possible by varying the ratios of the voltages at which the various electrodes are operated. It should be evident that with any of the conformations shown, if all of the electrodes are operated at the same potential the resulting raster will be substantially identical with that produced with the conventional type of tube shown in Fig. 1, with full pin-cushion distortion. As the potential difference between the lobed electrode and the one next to it is increased, more and more correction will be applied and a voltage ratio can quickly be found that will bring the sides of the rasters out or the corners in, as the case may be, to a required degree. If the lobed electrode is given either of the general forms shown, with the usual form of envelope, the most probable deviation from the desired shape of raster will be that when the proper voltage is applied to straighten out opposite sides of the raster the adjacent sides will be either over- or under-corrected. If the voltage differential is about what is desired when this occurs with respect to one pair of lobes, the other lobes can be lengthened or shortened sufficiently to accomplish the desired result.

With a color tube employing the configuration of Fig. 7 there are additional degrees of freedom for making adjustments by voltage alone. Assuming that the grid-to-screen voltage is fixed, the voltage between the band electrode and the grid may be varied, leaving the voltage ratio between lobed electrode and band a constant, the voltage on the lobed electrode alone may be varied or that on the band electrode alone. A fairly wide range of adjustment is thus readily available. If the voltage ratios are fixed by other parameters, the shape of the lobed electrode becomes more critical but experience has shown that with any envelope shape the effect of change in lobe length can quickly be determined.

The invention has been discussed in terms of the corrections to be secured at the extreme limits of the raster, where distortions are greatest. The corrections obtained are due primarily to the curvature of the lines of force where they leave or enter the lobed electrode, the lines quickly straightening out as the axis of the tube is approached. As in the case with the correction of optical aberrations, it is probable that complete correction can only be obtained for two degrees of deflection, and those here chosen are the points of maximum deflection at the middle of the sides of the raster and at its corners. Distortion of the same types as those that have been discussed are also produced in portions of the raster lying closer to the axis and there can, of course, be no assurance that these distortions are completely eliminated even if the edges of the raster are completely straightened. As has been shown, however, the desired ratio of spot displacement to deflecting force (and hence to yoke current if magnetic deflection is used), is unity, whereas that actually produced is proportional to the secant of the angle of deflection and this function decreases rapidly toward unity as the angle decreases from, say, 45 degrees, toward zero or normal angle of incidence. Experience proves that while the corrective deflections may not vary precisely in the ratio as the excess deflection the variation is in the right direction and of the right order of magnitude and the residual distortion, if any, is imperceptible except by careful measurement.

The invention has been described as applied to the so-called rectangular television tubes and only monochrome tubes have actually been illustrated, although color tubes have been referred to. Color tubes can be either of the mask or color grid variety and may employ one or more electron guns. Whatever the type of tube employed, the shape of the fields set up between the target surface facing the electron gun will be the same or very nearly so whether it be established between the screen itself, a mask, or a lens grid. The target structure is therefore not a part of this invention although it may determine which embodiment of the invention offers the greatest convenience or economy. As was mentioned in connection with the conventional tube shown in Fig. 1, even a tube which is not supplied with a conducting film will assume an equilibrium screen-potential not greatly different from the nearest collector of emitted secondary electrons and hence in certain forms of tube even the conducting film on the screen may not be necessary for operation of the apparatus in substantially the manner described. The forms shown and described are therefore not intended as limiting the scope of the invention, all intended limitations being specifically set forth in the claims that follow.

Having now described the invention what is claimed is:

1. In a cathode-ray tube for displaying television and like information on a substantially rectangular target area and comprising an envelope having a neck portion and a flaring funnel-shaped portion terminating in a relatively flat window through which said target area may be viewed, means for correcting distortions resulting from different lengths of path and angles of incidence of electrons in scanning various portions of said target area comprising an electron gun within said neck portion including an electron emitting cathode and means comprising at least one accelerating electrode for directing electrons emitted from said cathode in a concentrated beam against said target area, electrode structure extending from the neck portion into the flaring portion of said envelope electrode structure including lobes disposed symmetrically with respect to said rectangular target area, an electrode within said target area for establishing a substantially unipotential surface thereat, and connections for establishing said last identified electrode and said electrode structure at different potentials.

2. The invention as defined in claim 1 wherein said lobes extend toward the centers of the sides of said rectangular target area.

3. The invention as defined in claim 2 wherein the sides of the rectangular target area are of unequal length and the lobes extending toward the longer sides of said target area are longer than the lobes extending toward the shorter sides thereof.

4. The invention in accordance with claim 1 wherein the lobes on said electrode structure extend toward the corners of said target area.

5. The invention in accordance with claim 4 wherein the sides of said target area are of unequal length and indentations between the lobes of said electrode structure and facing the shorter of said sides are deeper than those facing the longer of said sides.

6. The invention in accordance with claim 1 wherein said envelope of said tube is of insulating material and said electrode structure comprises a conductive coating deposited thereon.

7. A cathode-ray tube for displaying images on its screen area and formed of a funnel-shaped wall extending outwardly from the tube neck to terminate in a window area closing the funnel mouth and wherein an electron gun is located within the tube neck to develop an electron beam adapted to be projected through the funnel-shaped tube and subjected to a bidirectional deflection in the region of the tube neck so that the beam impacts a display screen surface which is located within the window area and which becomes luminescent upon electron impact and whereon a substantially rectangular shaped raster is traced by the beam due to its deflection, the combination comprising an electrically conductive coating on the interior of the funnel-shaped wall which extends outwardly toward the screen from the tube neck, the conductive coating including a plurality of lobed portions extending along the funnel-shaped wall for portions of the distance of the beam travel between the electron gun and the screen so that the coating lobes are closer to the screen than are the regions between the lobes and wherein the lobes are arranged symmetrically relative to each of the tube axis and the raster to be traced, means for providing a substantially unipotential region between the outward terminations of the lobes and the screen and terminal means for applying different operating voltages to the coatings on the funnel-shaped wall and to the unipotential region between the coating and the screen to establish electron lenses of a strength to correct image distortion otherwise present in the raster traced upon the screen.

8. The apparatus claimed in claim 7 wherein the lobe portions are closer to the corners of the traced raster than to regions therebetween and the potential applied to the electrically conducting lobes is less than that applied to the uniform potential region between the lobes and the screen.

9. The apparatus claimed in claim 7 wherein the lobes are closer to the screen at regions between the corners of the raster traced and the potential applied to the lobes is greater than that applied to the unipotential surface.

10. The apparatus claimed in claim 7 comprising, in addition, a conductive coating upon the screen and arranged between the screen and unipotential surface adjacent to the lobed conducting coating so that angle of beam impact is substantially normal to the display screen.

11. A cathode-ray tube for displaying images on its phosphor-coated screen area which tube is formed of a funnel-shaped wall extending outwardly from the tube neck to terminate in a window area closing the funnel mouth and wherein an electron gun is located within the tube neck to develop an electron beam adapted to be projected through the funnel-shaped tube and subjected to bidirectional deflection in the region of the tube neck so that the beam impacts phosphor-coated screen surface which is within the window area and which becomes luminescent upon electron impact and wherein a substantially rectangular shaped raster is traced by the beam due to its deflection, the combination comprising an electrically conductive coating on the interior of the funnel-shaped wall which extends outwardly toward the screen from the tube neck, the conductive coating including a plurality of lobed portions extending along the funnel-shaped wall for portions of the distance of the beam travel between the electron gun and the screen so that the lobes of the coating are closer to the screen than are the regions between the lobes and wherein the lobes are arranged symmetrically relative to each of the tube axis and the raster to be traced, means for providing a substantially unipotential electrically conductive and electron beam permeable controlling surface between the outward terminations of the lobes and the screen and terminal means for applying different operating voltages to the coatings on the funnel-shaped wall and to the unipotential controlling surface to establish electron lenses of a strength and sign to correct image distortion otherwise present in the raster traced upon the screen.

References Cited in the file of this patent

UNITED STATES PATENTS

| | | |
|---|---|---|
| 2,631,254 | Nickless | Mar. 10, 1953 |
| 2,728,024 | Ramberg | Dec. 20, 1955 |
| 2,755,410 | Schlesinger | July 17, 1956 |